(12) United States Patent
Kanematsu et al.

(10) Patent No.: US 7,396,098 B2
(45) Date of Patent: Jul. 8, 2008

(54) INKJET PRINTING APPARATUS AND INKJET PRINTING METHOD

(75) Inventors: Daigoro Kanematsu, Yokohama (JP);
Mitsutoshi Nagamura, Tokyo (JP);
Tomomi Furuichi, Yokohama (JP);
Kazuo Suzuki, Yokohama (JP); Takao Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/563,942

(22) Filed: Nov. 28, 2006

(65) Prior Publication Data
US 2007/0153046 A1 Jul. 5, 2007

(30) Foreign Application Priority Data

Dec. 1, 2005 (JP) ............................. 2005-347932
Nov. 22, 2006 (JP) ............................. 2006-316326

(51) Int. Cl.
*B41J 2/205* (2006.01)

(52) U.S. Cl. ......................................... 347/15; 358/1.9

(58) Field of Classification Search .................... 347/3, 347/5, 15, 43, 16, 41; 358/1.2, 1.9, 3.13, 358/3.23
See application file for complete search history.

(56) References Cited

U.S. PATENT DOCUMENTS 6,290,330 B1 * 9/2001 Torpey et al. ................. 347/43
6,428,143 B2 * 8/2002 Irihara et al. ................. 347/43
6,561,610 B2 5/2003 Yamasaki et al.
7,198,345 B2 * 4/2007 Shibata et al. ................ 347/15

FOREIGN PATENT DOCUMENTS

| JP | 05-278221 | 10/1993 |
|---|---|---|
| JP | 09-156130 | 6/1997 |
| JP | 2002-292848 | 10/2002 |
| JP | 2004-155080 | 6/2004 |

* cited by examiner

*Primary Examiner*—Lamson D. Nguyen
(74) *Attorney, Agent, or Firm*—Fitzpatrick, Cella, Harper & Scinto

(57) ABSTRACT

An inkjet printing apparatus includes an edge detecting unit adapted to detect an edge portion and a non-edge portion in the image data; a memory adapted to store a plurality of edge reducing masks used to reduce image data in the edge portion and a plurality of non-edge reducing masks used to reduce image data in the non-edge portion; a reduced data generating unit adapted to generate multiple sets of edge reduced data from image data in the edge portion using the plurality of edge reducing masks and to generate multiple sets of non-edge reduced data from image data in the non-edge portion using the plurality of non-edge reducing masks; and a printing data generating unit adapted to generate multiple sets of printing data by combining the multiple sets of edge reduced data and the multiple sets of non-edge reduced data.

17 Claims, 13 Drawing Sheets

NON-EDGE DATA
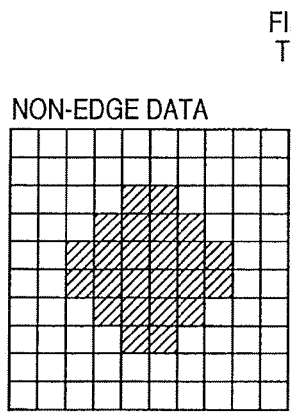
FIG. 8A
FIRST NON-EDGE THINNING MASK
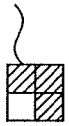
FIRST NON-EDGE THINNED DATA
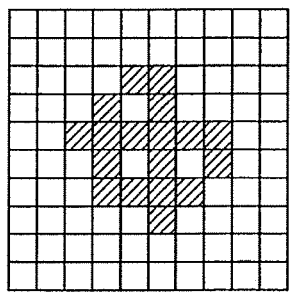
FIG. 8B
FIRST SYNTHESIZED DATA
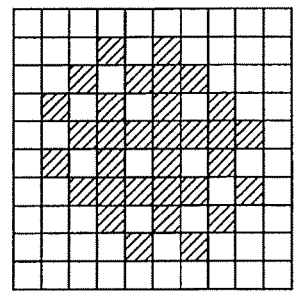
FIG. 8G
SECOND NON-EDGE THINNING MASK
FIG. 8C
SECOND NON-EDGE THINNED DATA
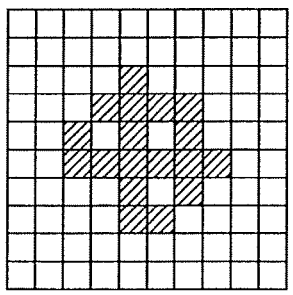
FIRST EDGE THINNING MASK
EDGE DATA
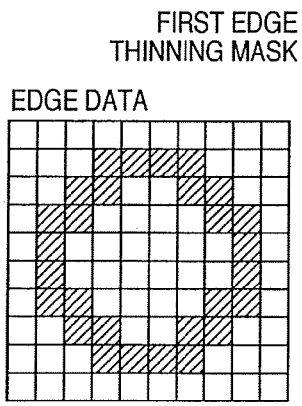
FIG. 8D
FIRST EDGE THINNED DATA
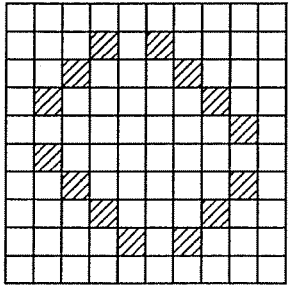
FIG. 8E
SECOND SYNTHESIZED DATA
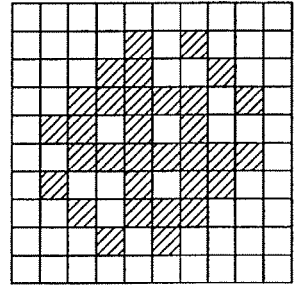
FIG. 8H
SECOND EDGE THINNING MASK
FIG. 8F
SECOND EDGE THINNED DATA
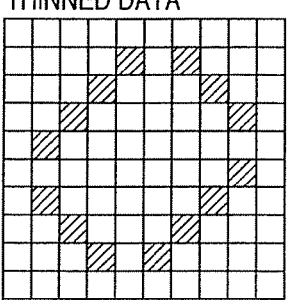

NON-EDGE DATA
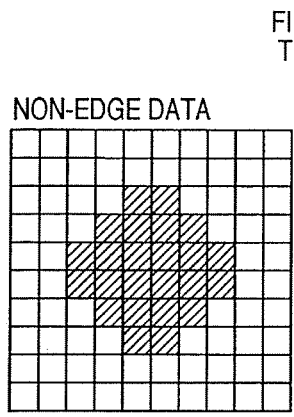
FIG. 11A
FIRST NON-EDGE THINNING MASK
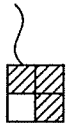
FIRST NON-EDGE THINNED DATA
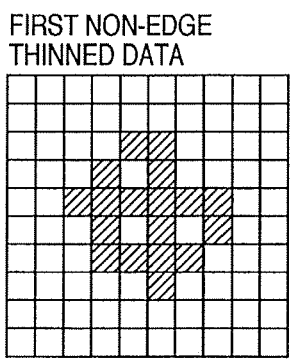
FIG. 11B
FIRST SYNTHESIZED DATA
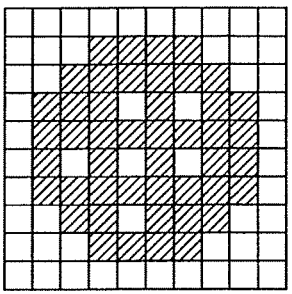
FIG. 11G
SECOND NON-EDGE THINNING MASK
FIG. 11C
SECOND NON-EDGE THINNED DATA
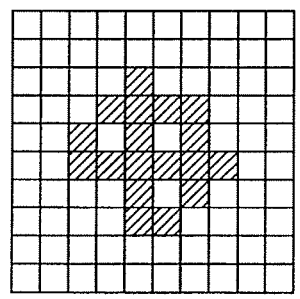
EDGE DATA
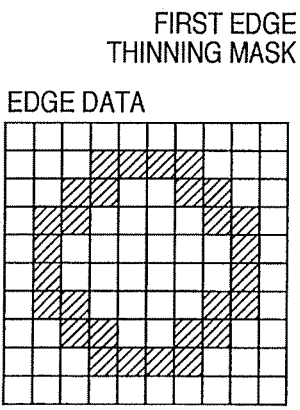
FIG. 11D
FIRST EDGE THINNING MASK
FIRST EDGE THINNED DATA
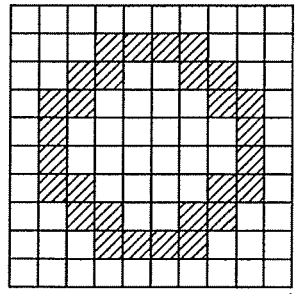
FIG. 11E
SECOND SYNTHESIZED DATA
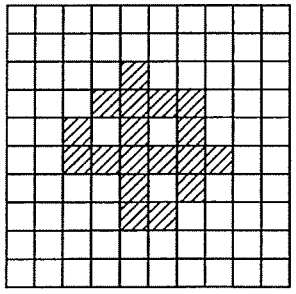
FIG. 11H
SECOND EDGE THINNING MASK
FIG. 11F
SECOND EDGE THINNED DATA
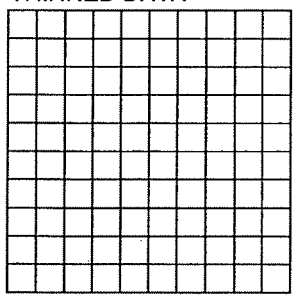

INKJET PRINTING APPARATUS AND INKJET PRINTING METHOD

BACKGROUND OF THE INVENTION

1. Field of the Invention

The present invention relates to an inkjet printing apparatus and an inkjet printing method for discharging ink from nozzle arrays of printheads for printing.

2. Description of the Related Art

Inkjet printing apparatuses which print on various recording media by discharging ink are capable of high-density, high-speed printing operation. Also, the inkjet printing scheme has many advantages including low running costs and low noise during printing operation. Consequently, inkjet printing apparatuses have been commercialized and used as stationary printers, portable printers, or other peripheral devices for various purposes.

Known printing schemes for inkjet printing apparatuses include the so-called serial printing scheme in which a carriage which carries a printhead and ink tank scans over a recording medium, discharges ink from nozzle arrays of the printhead, and thereby prints on the scanned area. In this scheme, the recording medium is fed by a predetermined amount in a direction (sub-scanning direction or transport direction) approximately orthogonal to the carriage scan direction (main scanning direction) between scans by the carriage. This scheme prints on the entire recording medium by repeating carriage scans and feeding the recording medium. Another known scheme is the so-called full-line printing scheme. This scheme performs printing by conveying a recording medium relative to a printhead in which discharge nozzles are arranged in a range which corresponds to the width of the recording medium.

Recently, a large number of inkjet printing apparatus with various advantages such as described above have been provided as products which perform color printing using multiple colors of ink. In such inkjet printing apparatuses, generally black ink is used frequently to print characters and the like. Consequently, sharpness, clearness, and high density of printed characters are required of the black ink. For that, there is a known technique which lowers permeation of black ink into printing media and thereby inhibiting coloring matter such as dyes and pigments in the black ink from permeating into the recording media. This increases the amount of coloring matter which remains fixed on the recording media and thereby increases the sharpness and density of printed images.

However, the use of black ink with reduced permeation into recording media may lead to problems such as those described below. Specifically, if the discharge amount of ink droplets is increased to increase the printing density of characters and the like printed in black ink, the ink can bleed in edge portions of the characters. Also, in an image in which black and color areas are placed adjacent to each other, black ink does not permeate the recording medium quickly because of its low permeation and may get mixed with color ink across borders between the areas. This can cause bleeding (deterioration of printing quality due to mixing of inks) on boundaries between the black and color areas.

Thus, Japanese Patent Laid-Open Application No. 05-278221 proposes a method which detects edge portions and non-edge portions in character data and the like to be printed in black ink, reduces the ink discharge amount in the non-edge portions, and thereby improves smear resistance and fixing characteristic while maintaining sharpness of printed characters and the like.

SUMMARY OF THE INVENTION

However, although decreasing the ink discharge amount in the non-edge portions reduces ink bleed and provides clear edge portions of characters and reduce lines as disclosed in Japanese Patent Laid-Open Application No. 05-278221, it also decreases printing density. On the other hand, increasing the discharge amount of ink droplets to increase the printing density of characters and the like can result in more than a little ink bleed in edge portions of characters and reduce lines.

Moreover, in an inkjet printing apparatus which applies the same color ink from multiple nozzle arrays of printheads, any misalignment among the nozzle arrays of the printheads can result in unclear edge portions of characters and reduce lines. Furthermore, with a printing apparatus which uses multi-pass printing, variations in paper feed can cause misalignment, resulting in blurred edge portions of characters and reduce lines.

The present invention has been made in view of the above circumstances and has an object to provide an inkjet printing apparatus capable of printing characters and reduce lines with clear edge portions and high density.

The present invention provides an inkjet printing apparatus capable of printing characters and reduce lines with clear edge portions and high density. Also, by performing multiple scans for printing using a single nozzle array per printhead or two nozzle arrays per printhead for the same color, the inkjet printing apparatus can print high-density, high-quality characters and line drawings while maintaining better definition.

Further features of the present invention will become apparent from the following description of exemplary embodiments with reference to the attached drawings.

BRIEF DESCRIPTION OF THE DRAWINGS

FIGS. 8A to 8H are diagrams illustrating an operation of edge and non-edge reducing processes according to the first embodiment;

FIGS. 11A to 11H are diagrams illustrating the operation of edge and non-edge reducing processes according to a third embodiment of the present invention.

DESCRIPTION OF THE EMBODIMENTS

First Embodiment

Embodiments of a printing apparatus according to the present invention will be described with reference to the drawings. Incidentally, they will be described by taking as an example an inkjet printing apparatus capable of printing color images using an inkjet printing scheme.

Figure 1:
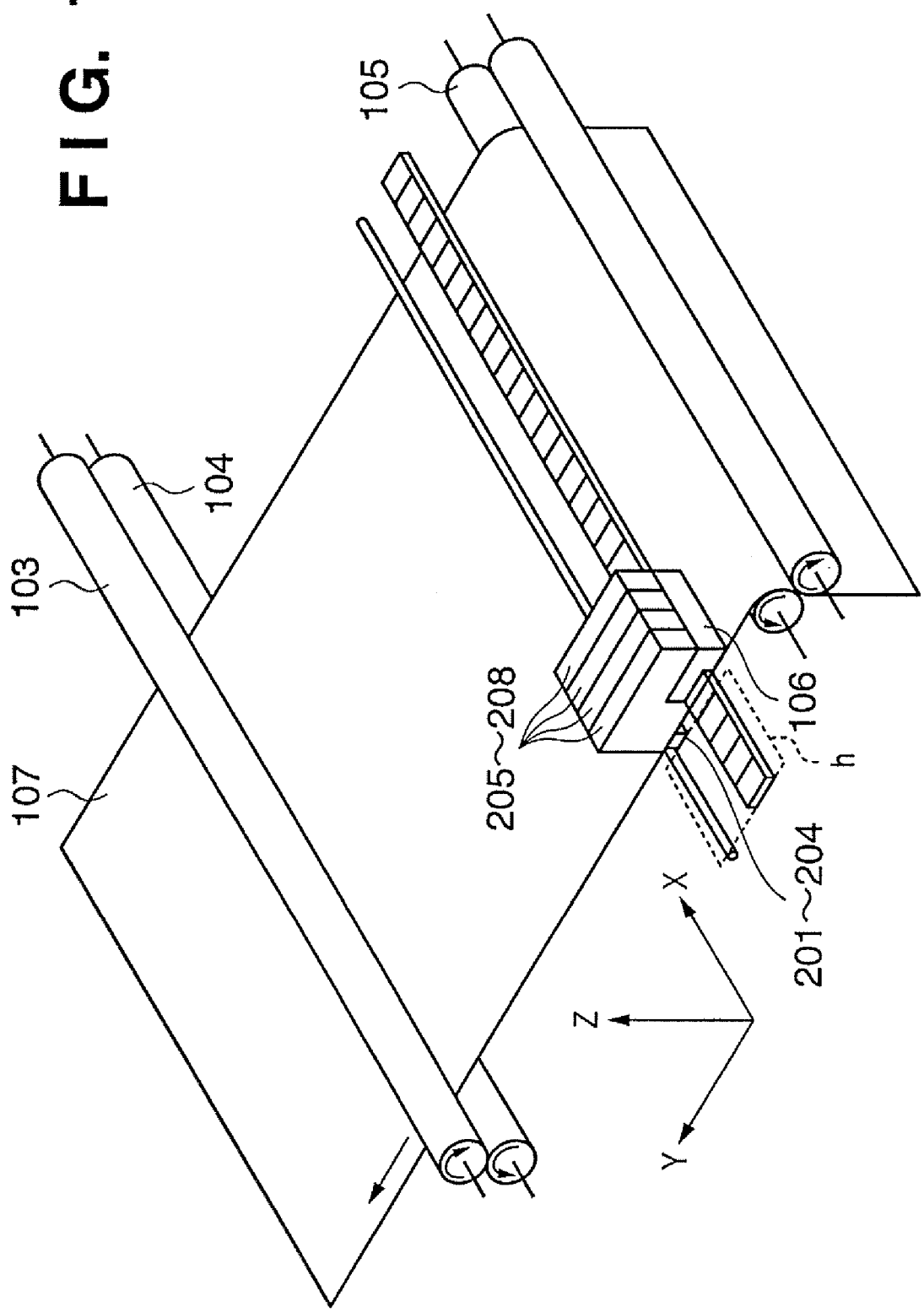
FIG. 1 is a schematic perspective view showing a configuration of the essence of an embodiment of an inkjet printing apparatus applicable to embodiments of the present invention.

FIG. 1 is a schematic perspective view showing the configuration of an embodiment of an inkjet printing apparatus to which the present invention can be applied. In FIG. 1, reference numerals 205 to 208 denote ink cartridges. Ink cartridges 205 to 208 include ink tanks containing four color inks (black, cyan, magenta, and yellow: Bk, C, M, and Y), respectively, and four printheads 201 to 204 corresponding to the four color inks.

Reference numeral 103 denotes a paper feed/drive roller, which rotates in the direction of the arrow in the figure while holding down recording medium 107 in conjunction with an auxiliary roller 104, and thereby conveys the recording medium 107. Furthermore, the paper feed/drive roller 103 and auxiliary roller 104 hold the recording medium 107. Reference numeral 106 denotes a carriage, which supports the four ink cartridges 205 to 208 and moves the printheads 201 to 204 together with four-color ink tanks for printing operation. The carriage 106 is controlled so as to wait at its home position h indicated by dotted lines in FIG. 1 when the inkjet printing apparatus is not printing or when the printheads 201 to 204 are going through a recovery operation.

Upon receiving a printing start command, the carriage 106, waiting at the home position h in FIG. 1 before the start of printing, moves in direction X in FIG. 1 to print in the area on the recording medium 107 corresponding to the printing width of the printhead 201 by driving the printing elements which have nozzle arrays installed in the printheads 201 to 204. When printing across the width of the recording medium 107 is finished with the carriage 106 moving in the main scanning direction (X direction or forward direction), the carriage 106 returns to its home position h and then moves again in the X direction in FIG. 1 to perform printing with the printheads 201 to 204. After a scan for printing is finished and before the next scan for printing is started, the paper feed roller 103 rotates in the direction of the arrow in FIG. 1 to feed the recording medium 107 by a necessary amount in the sub-scanning direction Y in FIG. 1. Through repetition of such main scans (X) for printing and sub-scans (Y) for paper feed, printing on the recording medium 107 is accomplished. The printing operation, which involves discharging ink from the printheads 201 to 204, is performed under the control of the printing control means.

To increase printing speed, printing may be performed not only during main scanning in a single direction (X or forward direction), but also during scanning in the backward direction in which the carriage returns to its home position h after a scan for printing in the forward direction in FIG. 1 is finished.

In the example described above, the ink tanks and printheads 201 to 204 are supported independently in the carriage 106. Alternatively, the ink tanks, which contain printing ink, and the printheads, which discharge ink toward the recording medium 107, may be integrated into inkjet cartridges. Also, an integrated multi-color printhead may be used to discharge multiple ink colors from a single nozzle array of a printhead.

At the position where a recovery operation is performed, there is a capping means (not shown) which caps those faces (discharge faces) of the printheads 201 to 204 in which discharge nozzle arrays (also called discharge apertures) are formed. There is also a recovery unit (not shown) which performs a head recovery operation such as removing thickened ink and air bubbles in the printheads 201 to 204 while the discharge nozzle arrays are capped.

Furthermore, a cleaning blade (not shown) and the like are installed on a front of the capping means and supported so as to protrude toward the printheads 201 to 204 in such a way as to abut against the discharge nozzles of the printheads 201 to 204. This allows the cleaning blade to protrude into the travel path of the printheads 201 to 204 after the recovery operation and wipe superfluous ink droplets and contamination from the discharge nozzles of the printheads 201 to 204 along with movement of the printheads 201 to 204.

Figure 2A:
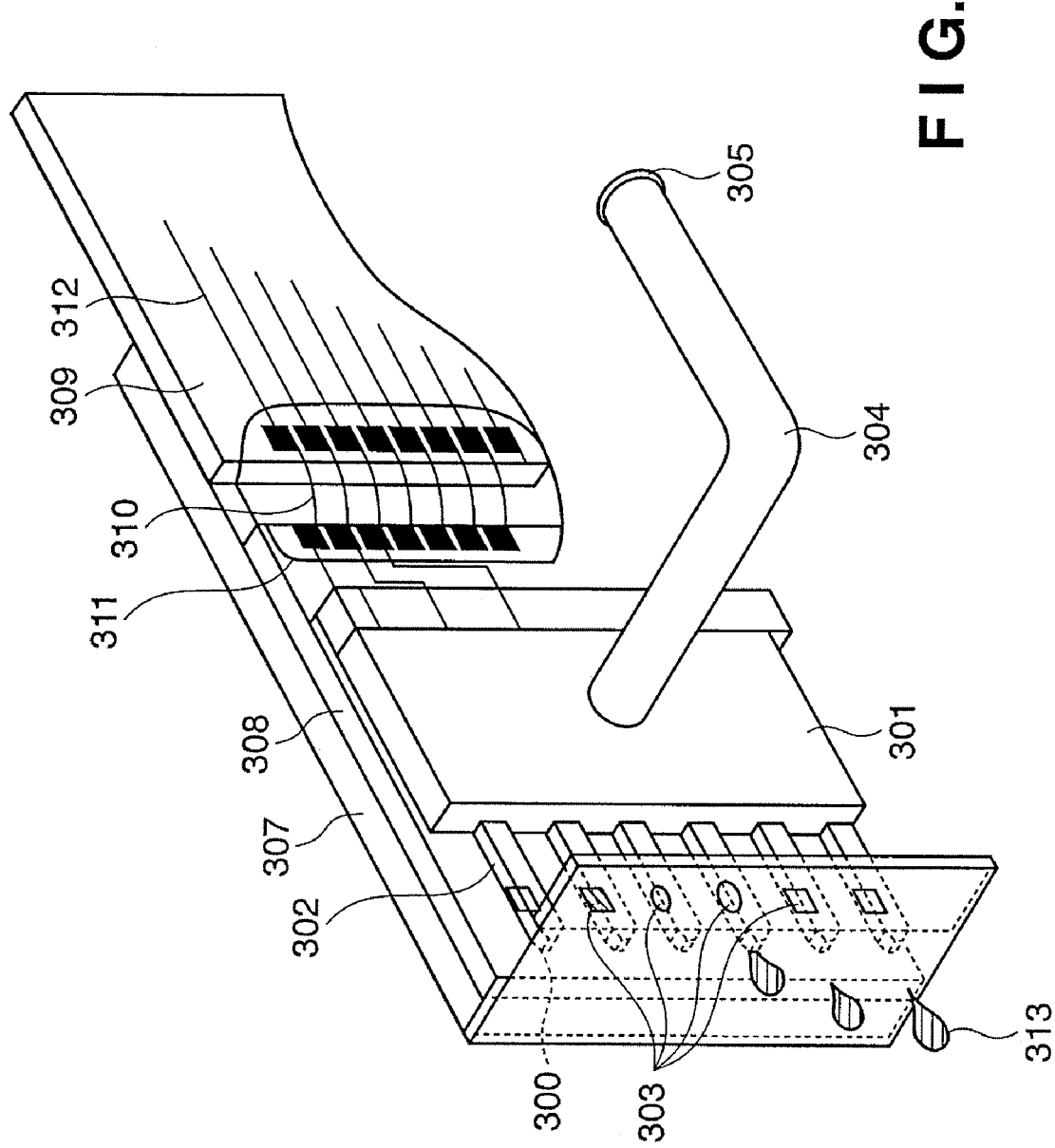
FIGS. 2A to 2C are diagrams showing the essence of a printhead applicable to embodiments of the present invention.

Next, the printhead 201 will be described with reference to FIGS. 2A to 2C by representing the printheads 201 to 204. The other printheads 202 to 204 have basically the same configuration as the printhead 201. FIG. 2A is a perspective view of the essence of the printhead 201 shown in FIG. 1.

As shown in FIG. 2A, in the printhead 201, a plurality of discharge nozzles 300 are arranged at predetermined intervals and a printing element 303 which generates energy for ink discharge is installed along a wall of each ink path 302 which communicates each of the discharge nozzles 300 with a common ink chamber 301. The printing elements 303 and their drive circuit are constructed on silicon using semiconductor manufacturing technology.

Also, a temperature sensor (not shown) and sub heater (not shown) are formed collectively on the silicon using a process similar to the semiconductor manufacturing process. A silicon substrate 308 with electrical wiring for the formed temperature sensor and sub heater is bonded to a heat-dissipating aluminum base board 307. Also, a circuit connector 311 on the silicon substrate 308 is connected to a printed board 309 via ultra-fine wiring 310 and a printing signal from the body of the inkjet printing apparatus is received via a signal circuit 312.

The common ink chamber 301 is coupled with the ink tank via a joint pipe 304 and ink filter 305, so that the common ink chamber 301 will be supplied with ink (for example, black ink) contained in the ink tank. The ink supplied from the ink tank and stored temporarily in the common ink chamber 301 enters the ink paths 302 via the capillaries and fills the ink paths 302 forming a meniscus at the discharge nozzles 300. As the printing elements 303 generate heat by being energized via an electrode (not shown), the ink on the printing elements 303 is heated suddenly, forming air bubbles in the ink paths 302. Expansion of the air bubbles causes black ink droplets 313 to be discharged from the discharge nozzles 300.

Next, the configuration of a print control circuit, which performs printing control of the inkjet printing apparatus shown in FIGS. 1 and 2A to 2C, will be described with reference to a block diagram shown in FIG. 3. In FIG. 3, which shows the entire control circuit for controlling the operation of the present invention, reference numeral 400 denotes an interface used to input the printing signal and control signals related to printing. Reference numeral 401 denotes an MPU (Micro Processing Unit) and 402 denotes a ROM (Read Only Memory) which stores a control program to be executed by the MPU 401, masks used to generate printing data, and the like. 403 denotes a dynamic RAM (Random Access Memory) which stores various data (the printing signal supplied to the printheads 201 to 204, control signals for printing, and the like). The RAM 403 can also store the number of printed dots, the number of replacements of the printheads 201 to 204, and so on. Reference numeral 404 denotes a gate array, which controls the supply of printing data to the printheads 201 to 204 and data transfer among the interface 400, MPU 401, and DRAM 403. The above components make up a printing controller 500 which carries out the operation of the present invention. Reference numeral 405 denotes a paper feed motor used to convey the recording medium 107 and reference numeral 406 denotes a carriage motor used to convey the printheads 201 to 204. Reference numerals 407 and 408 denote motor drivers which drive the paper feed motor 405 and carriage motor 406, respectively. Reference numeral 409 denotes head drivers which drive the respective printheads 201 to 204, and are provided in correspondence with the number of the printheads. Reference numeral 410 denotes a head identifying signal generating circuit which informs the MPU 401 about the type and number of printheads 201 to 204 mounted on a head section 501.

By making the duty factor for printing of non-edge portions greater than the duty factor for printing of edge portions, the first embodiment of the present invention makes it possible to print high-density, high-quality characters and line drawings while maintaining better definition. In particular, the inkjet printing apparatus is equipped with two printheads (nozzle arrays) for the same color to print image data by dividing the image data between them. Specifically, the inkjet printing apparatus prints image data by detecting edge portions and non-edge portions of images contained in the image data, increasing the duty factor for printing of the non-edge portions over the duty factor for printing of the edge portions, and printing each color (e.g., black) with two nozzle arrays 201-1 and 201-2 of the printhead 201. FIG. 2B shows a view of the discharge nozzles of the printheads 201 to 204 applicable to the first embodiment. As shown in FIG. 2B, each of the printheads 201 to 204 has two nozzle arrays 201-1 and 201-2, 202-1 and 202-2, 203-1 and 203-2, or 204-1 and 204-2 to assign each color to a pair of nozzle arrays.

Figure 4:
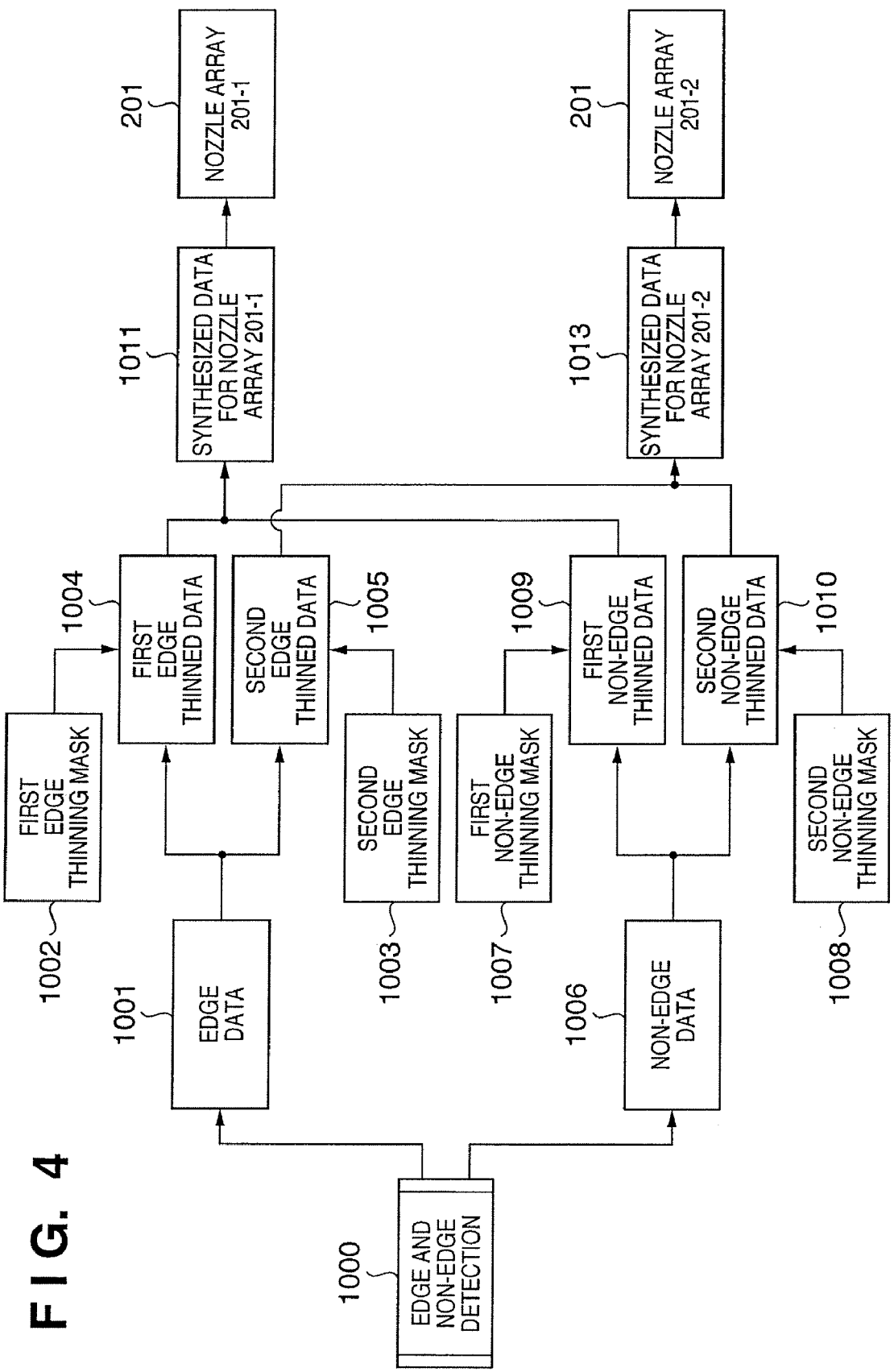
FIG. 4 is an overall functional block diagram showing data processing according to a first embodiment of the present invention.
Figure 5:
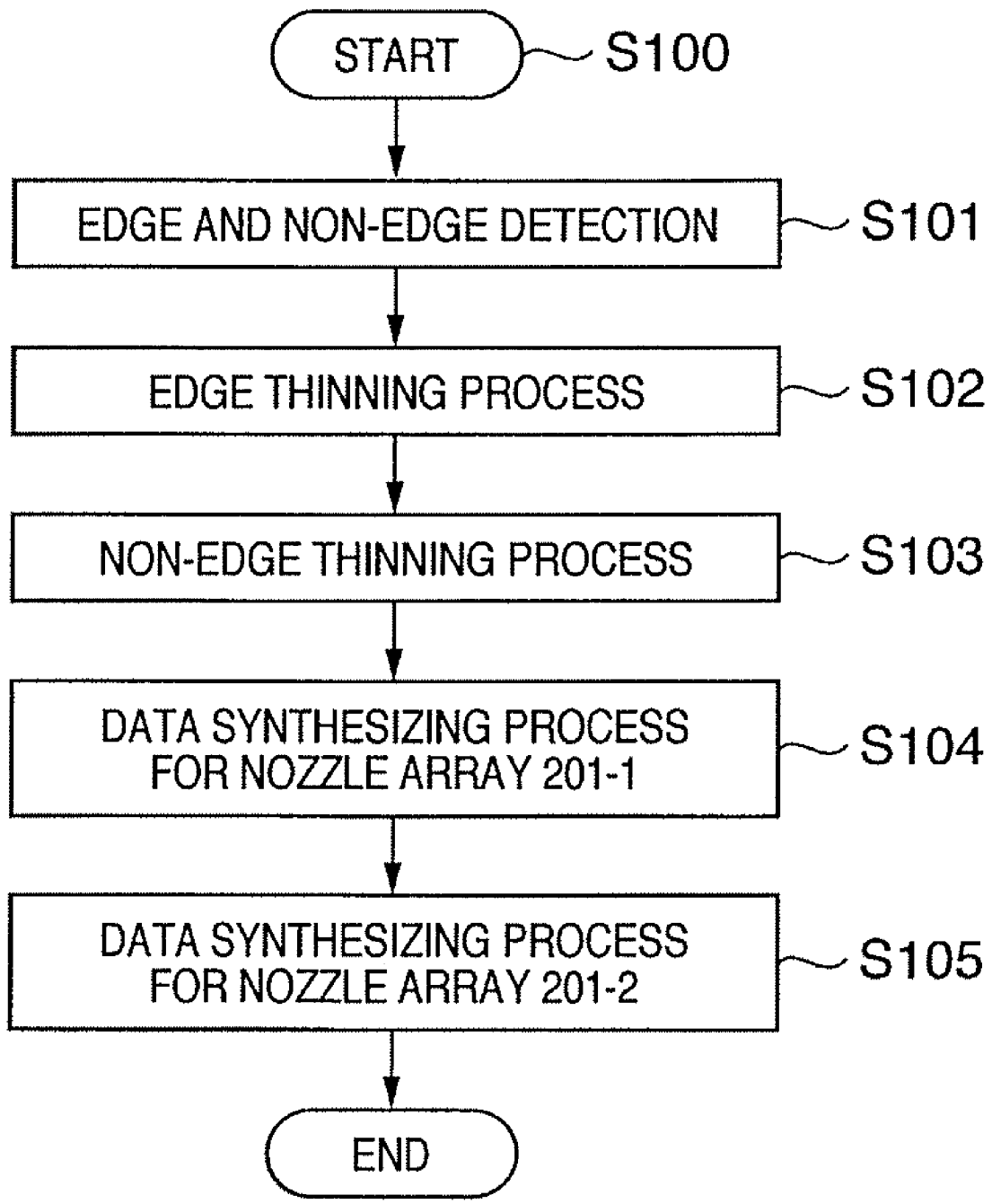
FIG. 5 is a data processing flowchart according to the first embodiment.

FIG. 4 is an overall functional block diagram showing data processing for generating printing data used for printing based on image data according to the first embodiment of the present invention. FIG. 5 is a flowchart of data processing for generating printing data used for printing based on image data according to the first embodiment. The two nozzle arrays 201-1 and 201-2 for black ink will be cited in the following description. Incidentally, the image data according to the present invention is constituted of image data received from a host machine connected with the printing apparatus and obtained by separating the received image data according to ink color. Furthermore, the printing data is constituted of the data sent out by the printing apparatus to the nozzles of the printheads which discharge respective ink colors to print an image on a recording medium.

First, edge data 1001 and non-edge data 1006 are generated from image data through an edge and non-edge detecting process 1000 (Step S101). Next, first edge reduced data 1004 and second edge reduced data 1005 are generated by reducing the edge data 1001 using two masks such as a first edge reducing mask 1002 and second edge reducing or downsampling mask 1003 (Step S102) In this specification, thinning or down-sampling process is referred to as reducing process. Furthermore, first non-edge reduced data 1009 and second non-edge reduced data 1010 are generated by reducing the non-edge data 1006 using two masks such as a first non-edge reducing mask 1007 and second non-edge reducing mask 1008 (Step S103).

The first edge reduced data 1004 and first non-edge reduced data 1009 are combined to generate combined data 1011 for the nozzle array 201-1, i.e., printing data for the nozzle array 201-1 (Step S104). Similarly, the second edge reduced data 1005 and second non-edge reduced data 1010 are combined to generate combined data 1013 for the nozzle array 201-2, i.e., printing data for the nozzle array 201-2 (Step S105). The combined data 1011 for the nozzle array 201-1 and combined data 1013 for the nozzle array 201-2 are transferred to the nozzle array 201-1 and nozzle array 201-2 of the printhead 201, respectively, in order to be printed thereby.

Figure 6:
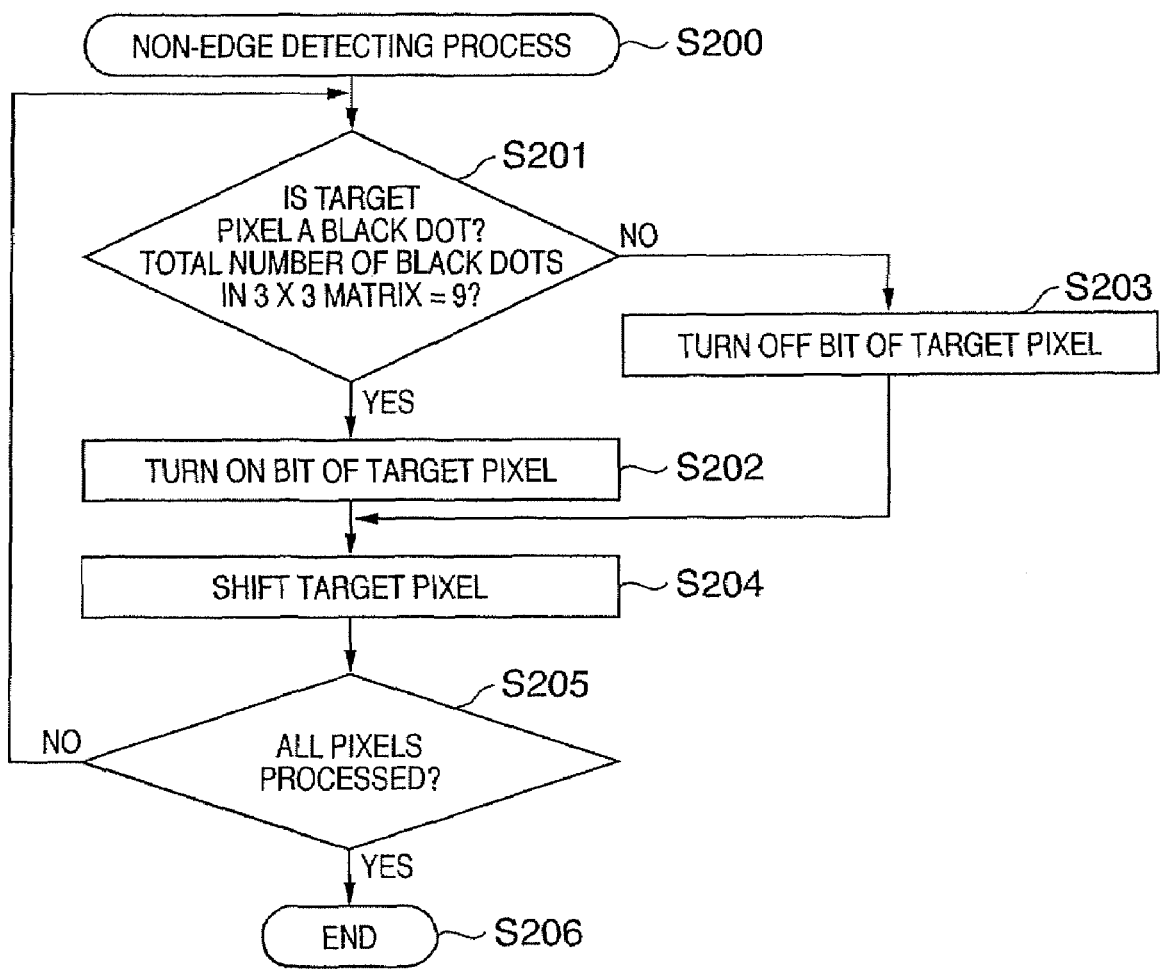
FIG. 6 is a flowchart of a non-edge detecting process according to the first embodiment.

FIG. 6 is a flowchart of a non-edge detecting process in the edge and non-edge detecting process 1000 of image data according to the first embodiment of the present invention.

It is determined whether a target pixel in the printing data is a black dot and whether the total number of black dots in a 3×3 matrix is 9 (Step S201). If the total number of black dots is 9, the target pixel belongs to a non-edge portion and thus the bit of the target pixel is turned ON (black) (Step S202). Otherwise, the target pixel belongs to an edge portion and thus the bit of the target pixel is turned OFF (white) (Step S203). Next, the target pixel in the image data is shifted by one pixel (Step S204). This operation is repeated and when the detection process of all the pixels in the image data is finished, the detection process of non-edge portions in the printing data is completed (Step S205). If the detection process of all the pixels is not completed, the above operation is repeated. When the process in FIG. 6 is finished, the data having an ON (black) bit (i.e., non-edge data) can be extracted from the image data.

Figure 7A:
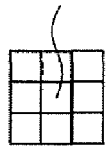
FIGS. 7A to 7D are diagrams illustrating an example of non-edge detection according to the first embodiment.
Figure 7B:
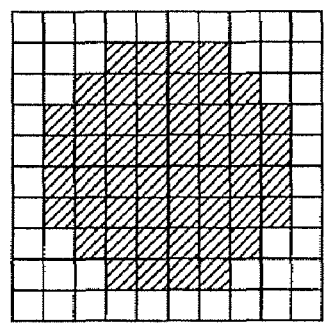
Figure 7C:
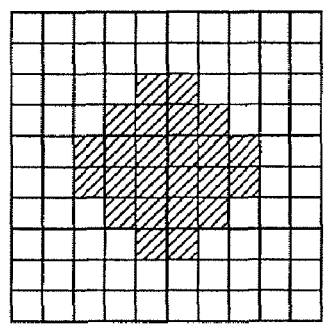

FIGS. 7A to 7D are diagrams illustrating an example of non-edge detection. In FIG. 7A, image data is represented by a 3×3 matrix around a target pixel (in FIG. 7A, the target pixel consists of one pixel at the center). FIG. 7B shows an original image (image data). Non-edge portions in the image data are detected by shifting the 3×3 matrix on a pixel-by-pixel basis. As the bit of the target pixel is turned ON (black) when the total number of black dots in the matrix is 9, non-edge data such as shown in FIG. 7C is generated.

Figure 7D:
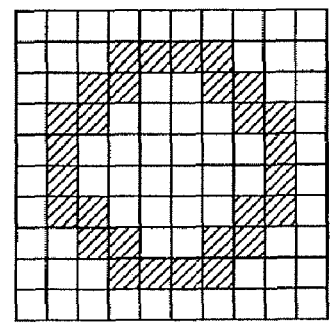

Edge data such as shown in FIG. 7D can be generated by subtracting the non-edge data from the original image data or by exclusive-ORing (EX-OR) the non-edge data with original image data. Although the edge portion is detected here as a single pixel on an outline and the non-edge portion is detected as the other pixels, this is not restrictive and two or more pixels may be detected as an edge portion. To detect two or more pixels as an edge portion, the non-edge portion may be detected using a matrix larger than 3×3 pixels.

FIGS. 8A to 8H are diagrams illustrating edge and non-edge reducing processes according to this embodiment. The non-edge data in FIG. 8A is ORed with a first non-edge mask of a 75% duty factor to generate the first non-edge data in FIG. 8B. It is assumed here that the first non-edge mask is composed of a 2×2 matrix and that the pixels in the non-edge data are ORed with it repeatedly in units of 2×2 pixels. Similarly, the non-edge data is ORed with a second non-edge mask of a 75% duty factor to generate the second non-edge data in FIG. 8C. Dots are generated in the first non-edge data and second non-edge data which correspond to the upper left and lower right pixels in the 2×2 matrix, and the duty factor of the non-edge portion is 75%×2=150%. Here, the non-edge data is reduced by 25% using the first non-edge mask of a 75% duty factor. That is, the first non-edge mask of a 75% duty factor is a mask with a reducing rate of 25%. Consequently, 75% of the non-edge data is printed.

Next, the edge data and first edge mask of a 50% duty factor in FIG. 8D are ORed to generate the first edge reduced data in FIG. 8E. It is assumed here that the first edge mask is composed of a 2×2 matrix and that the pixels in the edge data are ORed with it repeatedly in units of 2×2 pixels. Similarly, the edge data is ORed with a second edge mask of a 50% duty factor to generate the second edge reduced data in FIG. 8F.

The first edge mask and second edge mask are complementary to each other, and the duty factor of the edge portion is 50%×2=100%.

Next, the first non-edge reduced data in FIG. 8B and first edge reduced data in FIG. 8E are ORed to generate the first combined data in FIG. 8G. Similarly, the second non-edge reduced data in FIG. 8C and second edge reduced data in FIG. 8F are ORed to generate the second combined data in FIG. 8H. The first combined data is transferred to the nozzle array 201-1 and the second combined data is transferred to the nozzle array 201-2 of the printhead 201. They are printed via the respective nozzle arrays 201-1, 201-2 to generate an image with a 100% duty factor in the edge portion and 150% duty factor in the non-edge portion. In this way, the duty factor for printing is varied between the non-edge portions and edge portions using masks of different duty factors for edge reducing and non-edge reducing. This increases the proportion of edge portions in the case of small characters and line drawings, reducing crush or migration of characters due to excessive ink discharge and increases the proportion of non-edge portions in the case of large characters, increasing density.

As described above, this embodiment makes it possible to print high-density, high-quality characters and line drawings while maintaining better definition by detecting edge portions and non-edge portions, generating combined data using two different masks, and printing each color with two nozzle arrays.

Figure 2B:
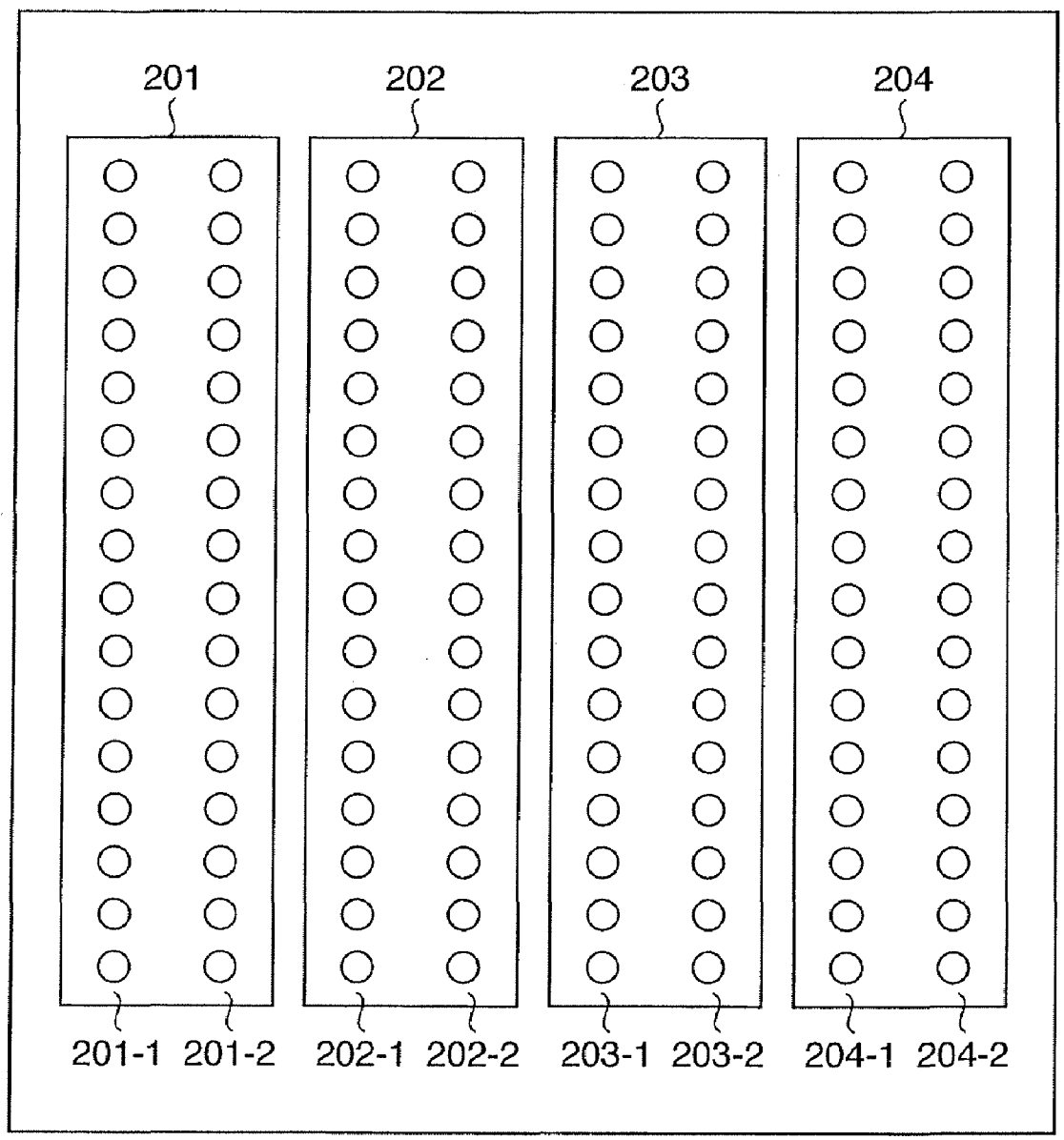
Figure 3:
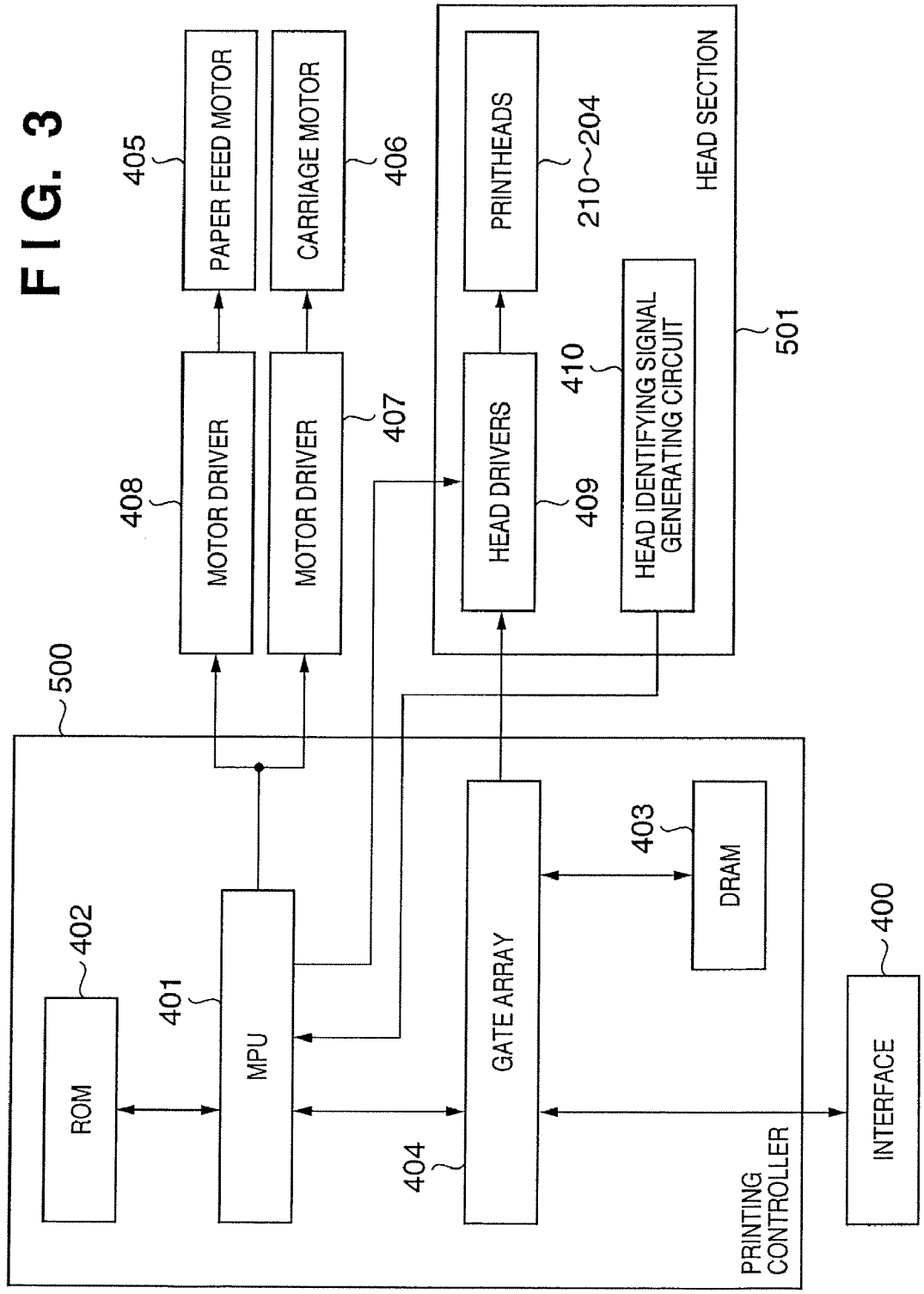
FIG. 3 is a block diagram of a control circuit of an inkjet printing apparatus applicable to embodiments of the present invention.

Incidentally, although a printhead with two nozzle arrays is used in FIG. 2B to discharge ink of each color, two printheads, each with one nozzle array, may be used to discharge ink of each color. Also, although ink of each color is discharged from two nozzle arrays in the first embodiment to increase the duty factor for printing, more than two nozzle arrays may be used alternatively.

Figure 2C:
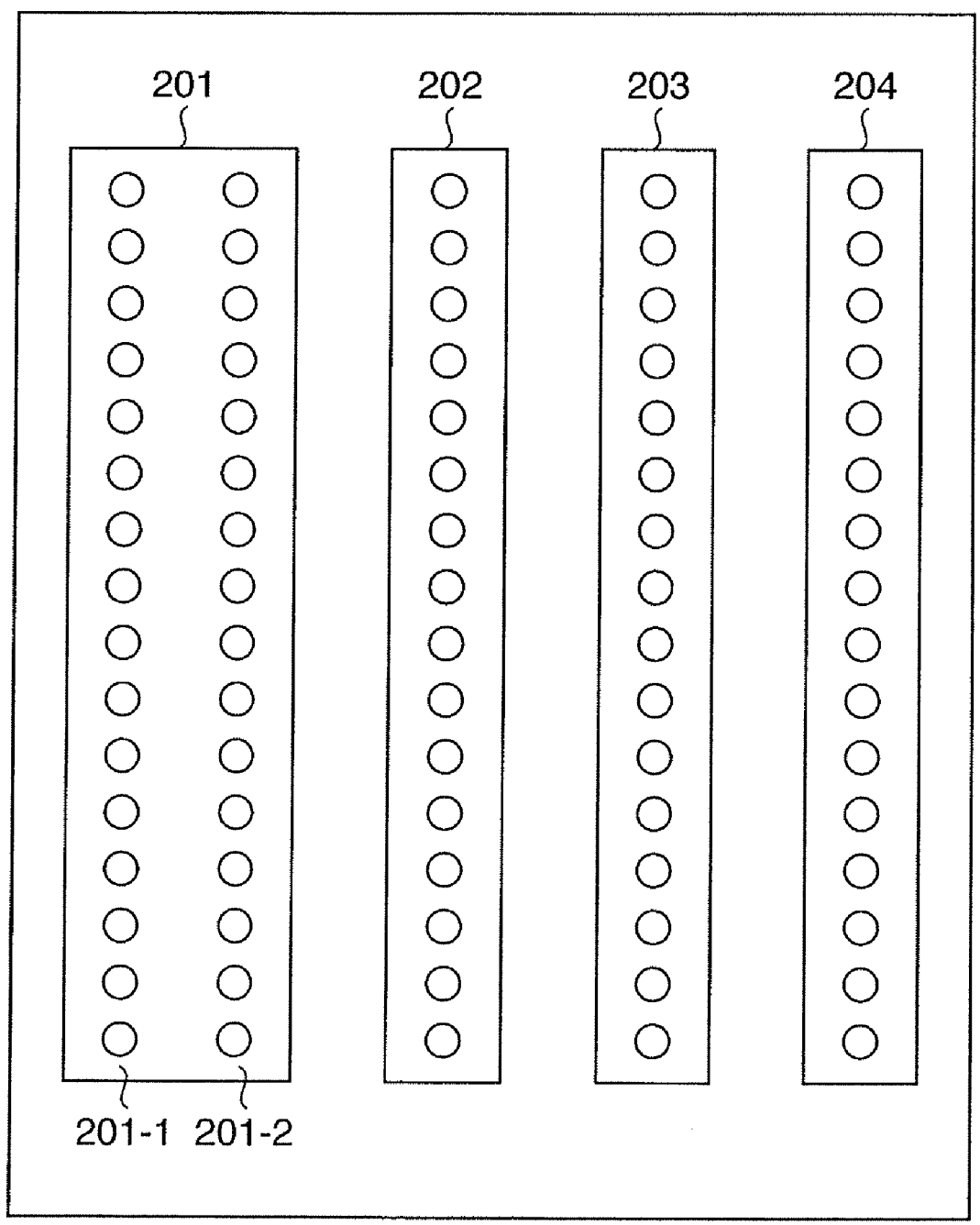

Also, although each printhead is equipped with two nozzle arrays to discharge ink (FIG. 2B) in the first embodiment, it is alternatively possible to increase the number of nozzle arrays only in the printhead which discharges ink to print characters and line drawings (FIG. 2C).

Also, although the first and second edge reducing masks have the same reducing rate (duty factor) in the first embodiment, they may have different reducing rates. Similarly, the first and second non-edge reducing masks may have different reducing rates.

Second Embodiment

A second embodiment of the present invention makes it possible to print high-density, high-quality characters and line drawings while maintaining better definition by performing two or more scans for printing with each printhead to increase the duty factor for printing of the non-edge portion over the duty factor for printing of the edge portion.

Figure 9:
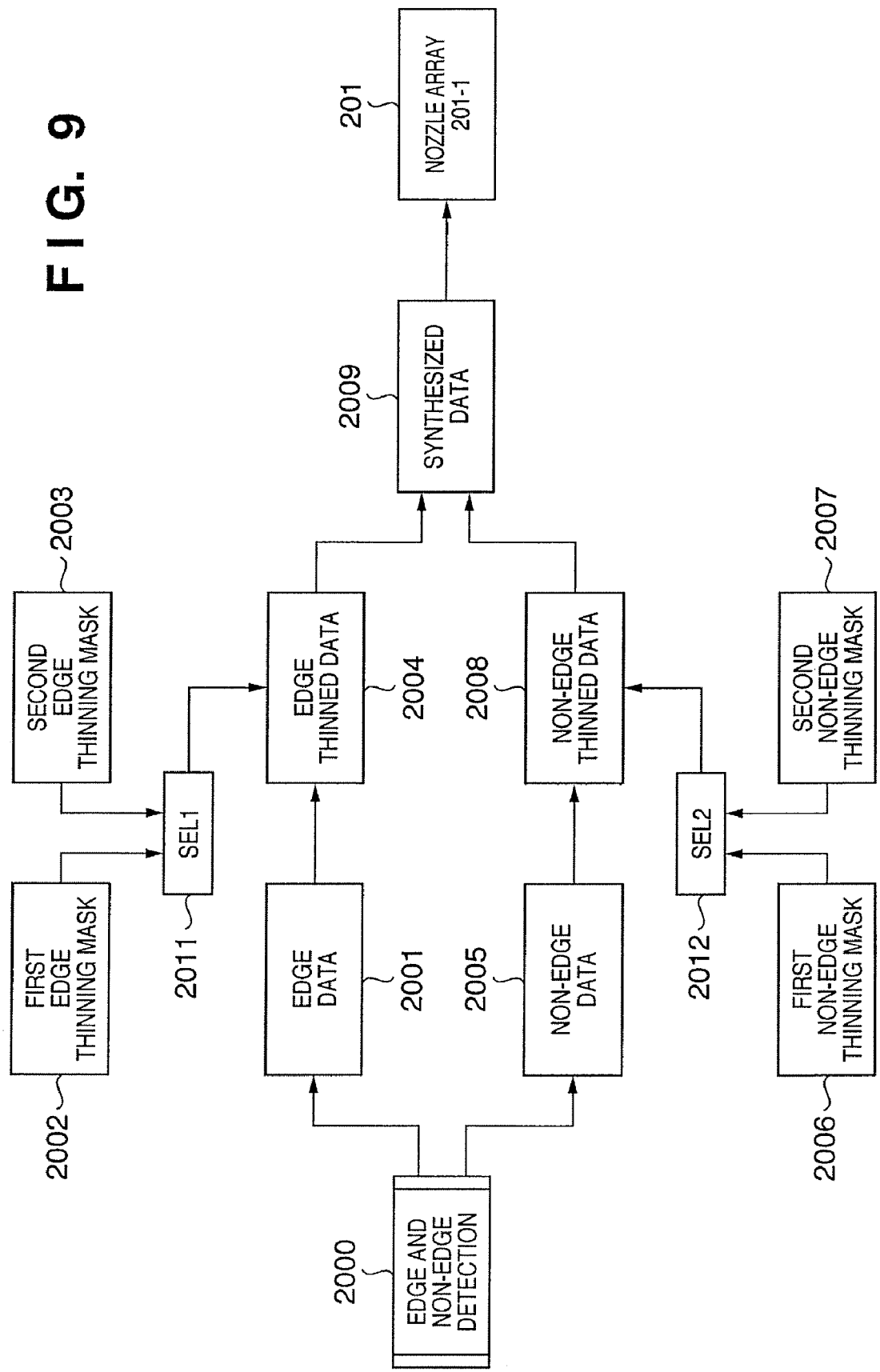
FIG. 9 is an overall functional block diagram showing data processing according to a second embodiment of the present invention.
Figure 10:
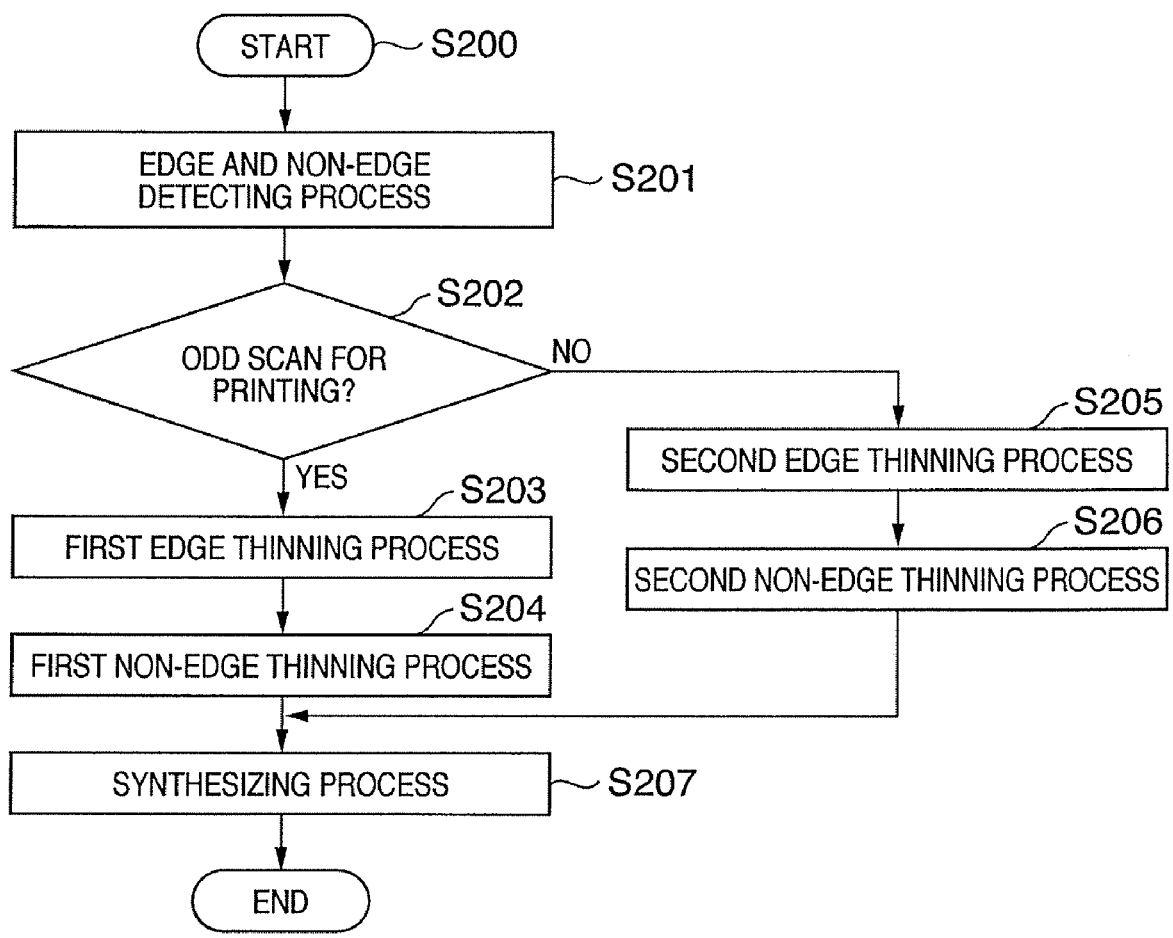
FIG. 10 is a flowchart illustrating an operation of the second embodiment.

FIG. 9 is an overall functional block diagram showing data processing according to the second embodiment. FIG. 10 is a flowchart illustrating the second embodiment. Edge data 2001 and non-edge data 2005 are generated through an edge and non-edge detecting process 2000 (Step S201).

In an odd scan for printing (Step S202), the edge data is subjected to a first edge reducing process (Step S203) by a first edge reducing mask 2002 to generate edge reduced data 2004. On the other hand, the non-edge data is subjected to a first non-edge reducing process (Step S204) by a first non-edge reducing mask 2006 to generate non-edge reduced data. The edge reduced data 2004 and non-edge reduced data 2008 are ORed to generate combined data 2009 (Step S207). Printing is performed with the nozzle arrays 201-1 of the printhead 201 based on the combined data 2009 generated.

In an even scan for printing, the edge data 2001 is subjected to a second edge reducing process (Step S205) by a second edge reducing mask 2003 to generate edge reduced data 2004. On the other hand, the non-edge data 2005 is subjected to a second non-edge reducing process (Step S206) by a second non-edge reducing mask 2007 to generate non-edge reduced data 2008. The edge reduced data 2004 and non-edge reduced data 2008 are ORed to generate combined data 2009. Printing is performed with the same nozzle arrays 201-1 of the printhead 201 based on the combined data 2009 generated. The use of the same edge reducing mask and non-edge reducing mask as the first embodiment in terms of duty factor makes it possible to increase the duty factor for printing of the non-edge portions over the duty factor for printing of the edge portions with only the single nozzle array 201-1 of the printhead 201.

By modifying the settings of the edge reducing mask and non-edge reducing mask every scan for printing in this way, it is possible to print high-density, high-quality characters and line drawings while maintaining better definition.

Third Embodiment

A third embodiment of the present invention relates to a method for printing edge portions with a single nozzle array 201-1, and non-edge portions with two nozzle arrays 201-1 and 201-2 of the printhead 201 to reduce degradation of character quality due to misalignment of the printheads.

FIGS. 11A to 11H are diagrams illustrating the operation of edge and non-edge reducing processes according to the third embodiment of the present invention. The non-edge data in FIG. 11A is ORed with the first non-edge mask of a 75% duty factor to generate the first non-edge reduced data in FIG. 11B. It is assumed here that the first non-edge mask is composed of a 2×2 matrix and that the pixels in the non-edge data are ORed with it repeatedly in units of 2×2 pixels.

Similarly, the non-edge data is ORed with the second non-edge mask of a 75% duty factor to generate the second non-edge data in FIG. 11C. Dots are generated in the first non-edge data and second non-edge data which correspond to the upper left and lower right pixels in the 2×2 matrix, and the duty factor of the non-edge portion is 75%×2=150%. Next, the edge data in FIG. 11D is ORed with the first edge mask of a 100% duty factor to generate the first edge reduced data in FIG. 11E.

It is assumed here that the first edge mask is composed of a 2×2 matrix and that the pixels in the edge data are ORed with it repeatedly in units of 2×2 pixels. Similarly, the edge data is ORed with the second edge mask of a 0% duty factor to generate the second edge reduced data in FIG. 11F. The use of the 0% duty factor causes the edge data to be printed only with the printing nozzle 201.

Next, the first non-edge reduced data in FIG. 11B and the first edge reduced-data in FIG. 11E are ORed to generate the first combined data in FIG. 11G. Similarly, the second non-edge reduced data in FIG. 11C and the second edge reduced data in FIG. 11F are ORed to generate the second combined data in FIG. 11H. The first combined data is transferred to the nozzle array 201-1 and second combined data is transferred to the nozzle array 201-2. They are printed there to generate an image with a 100% duty factor in the edge portion and 150% duty factor in the non-edge portion. Since the edge data is printed with only the nozzle array 201-1, ink droplets discharged from the nozzle arrays 201-1 and 201-2 cause less displacement. Consequently, edge portions of characters are printed sharply. Also, the proportion of edge portions is increased in the case of small characters, reducing crush or migration of characters due to excessive ink discharge and the proportion of non-edge portions is increased in the case of large characters, increasing density.

As described above, this embodiment makes it possible to print high-density, high-quality characters and line drawings while maintaining better definition by detecting edge portions and non-edge portions, generating respective data using two different masks, and printing the edge portions with only a single nozzle array.

Although the third embodiment has been described by citing an example in which two nozzle arrays 201-1 and 201-2 are used, printing may be performed with a single printhead having a single nozzle array through two or more printing scans by printing edge portions through one printing scan and non-edge portions through two or more printing scans. In that case, the first combined data in FIG. 11G and second combined data in FIG. 11H according to the third embodiment will be printed by the first scan for printing and second scan for printing, respectively.

By printing edge portions through a single printing scan in this way, it is possible to reduce the misalignment effect caused by variations in paper feed, and thereby print high-density, high-quality characters and line drawings while maintaining better definition.

Fourth Embodiment

A fourth embodiment makes it possible to print high-quality characters and line drawings regardless of printing mode by changing the duty factors for printing of both edge portions and non-edge portions according to the printing mode when printing images.

A plurality of printing modes is available on the printing apparatus, including High Speed mode, which gives priority to printing speed over image quality, High Image Quality mode, which gives priority to image quality over printing speed, and Standard mode, which reconciles image quality with printing speed. One of the printing modes is selected by the user or is set automatically by the control unit of the printing apparatus in accordance with the type of recording medium and image data to be printed. The printing speed increases in the order: High Image Quality mode, Standard mode, and High Speed mode. On the other hand, the quality of printed images increases in the order: High Speed mode, Standard mode, and High Image Quality mode. Methods for increasing the printing speed include one which decreases the time required for printing by increasing the scan speed of the carriage during printing scans or decreasing the number of printing scans (passes) in the same area. Methods for increasing the image quality include one which reduces missed shots of ink droplets by decreasing the scan speed of the carriage during printing scans or reducing color irregularities of each nozzle by increasing the number of printing scans (passes) in the same area.

According to this embodiment, edge reducing masks and non-edge reducing masks of different reducing rates are provided to accommodate the printing modes, and printing data is generated using reducing masks corresponding to a specified printing mode.

When Standard mode is specified on a printer driver installed on a host computer and interfaces of the printing apparatus, printing is performed in a manner similar to the first embodiment. Specifically, printing data is generated using first and second edge reducing masks of a 50% duty factor and first and second non-edge reducing masks of a 75% duty factor. Consequently, edge portions of the image are printed at a duty factor of 100% and non-edge portions of the image are printed at a duty factor of 150%.

When the High Speed mode is specified, almost equal duty factors for printing are set for the edge portions and non-edge portions so that printing can be done even if the scanning speed of the carriage is increased. The first and second edge reducing masks used to generate edge reduced data are set at a duty factor of 50% and the first and second non-edge reducing masks used to generate non-edge reduced data are set at a duty factor of 60%. Consequently, edge portions of the image are printed at a duty factor of 100% and non-edge portions of the image are printed at a duty factor of 120%. A higher duty factor for printing of non-edge portions results in higher-density, higher-quality characters and line drawings. However, in a mode which gives priority to printing speed, the time required for the ink to fix may sometimes be longer than the time until the end of printing. This could cause smears if too much ink is supplied. Thus, the duty factor for printing of non-edge portions is turned down slightly.

When High Image Quality mode is specified, the edge portions of characters and line drawings can be printed with their definition maintained by increasing the duty factor for printing by one nozzle array to reduce image degradation due to misalignment in the carriage travel direction or misalignment in the transport direction resulting from transport error. For that, the first and second edge reducing masks used to generate edge reduced data are set at duty factors of 100% and 0%, respectively, and the first and second non-edge reducing masks used to generate non-edge reduced data are set at a duty factor of 75%. Consequently, edge portions of the image are printed at a duty factor of 100% and non-edge portions of the image are printed at a duty factor of 150%. In High Image Quality mode, the edge portions are printed by one nozzle array to maintain their definition and the duty factor for printing of the non-edge portions is increased to improve the image quality of characters and line drawings. Incidentally, the duty factors of the first and second non-edge reducing masks may be set at 90% and 10%, respectively to print the image with the two nozzle arrays instead of one nozzle array. In this way, by using a mask with a higher duty factor for one nozzle array, it is possible to perform printing with better definition of characters and line drawings maintained.

Thus, by preparing multiple reducing masks for both edge portions and non-edge portions and changing the masks for both edge portions and non-edge portions according to the printing mode, it is possible to print high-density, high-quality characters and line drawings in any of the printing modes.

Incidentally, all the examples cited in the above embodiment involve setting the duty factor for printing of non-edge portions higher than the duty factor for printing of edge portions in all the printing modes. However, depending on the printing mode, masks with the same duty factor for printing may be used for edge portions and non-edge portions or a mask with a lower duty factor may be used for non-edge portions than for edge portions. For example, it is conceivable to set a higher duty factor for non-edge portions than edge portions in Standard and High Image Quality modes while setting a lower duty factor for non-edge portions than edge portions in High Speed mode to reduce smears. In High Speed mode, the reducing masks used may be such as to make the duty factor for printing of non-edge portions lower than the duty factor for printing of edge portions: specifically, the edge portions may be printed at a duty factor of 90% while printing the non-edge portions at a duty factor of 80%. Alternatively, the reducing masks used may be such as to cause the image to be printed at a 90% duty factor both in edge portions and non-edge portions.

Fifth Embodiment

A fifth embodiment makes it possible to print high-quality characters and line drawings regardless of the type of recording medium or printing mode by printing images by changing the duty factors for printing of both edge portions and non-edge portions according to the type of recording medium and printing mode.

The recording media used on inkjet printing apparatuses includes glossy paper which is used to produce photo images and absorbs a large quantity of ink, coated paper which is used to print characters and drawings and absorbs a somewhat large quantity (smaller than the glossy paper) of ink, and plain paper which is used for ordinary printing and absorbs a small quantity of ink. Since the quantity of ink which can be absorbed varies with the type of recording medium, the printing apparatus supplies different quantities of ink according to the type of recording medium so that printing can be performed appropriately.

By supplying an appropriate quantity of ink based on the printing speed determined according to the printing mode and ink absorbency determined according to the type of recording medium, it is possible to print high-density, high-quality characters and line drawings while maintaining better definition. The higher the printing speed and/or the lower the ink absorbency, the more likely smears will occur. Thus, edge and non-edge reducing masks are selected as to decrease the duty factor for printing of the image. On the other hand, the lower the printing speed and/or the higher the ink absorbency, the less likely smears will occur. Thus, such edge and non-edge reducing masks are selected as to increase the duty factor for printing of the image and increase the density.

In this way, by preparing multiple reducing masks for both edge portions and non-edge portions and changing the masks for both edge portions and non-edge portions according to printing conditions such as the printing mode and the type of recording medium, it is possible to print appropriate high-quality characters and line drawings according to the printing mode and the type of recording medium.

Although printing of a single color of black has been described in the first to fifth embodiments, other colors (e.g., cyan, magenta, and yellow) can also be subjected to similar data processing, as required, and printed using respective nozzle arrays or printheads.

Needless to say, the object of the present invention can also be achieved by a storage medium containing the software program code that implements the functions of the above embodiments: it is supplied to a system or apparatus, the computer (or CPU or MPU) of which then reads the program code out of the storage medium and executes it.

In that case, the program code will itself read out from the storage medium implement the functions of the above embodiments, and the storage medium which stores the program code will constitute the present invention.

As the storage medium for supplying the program code, for example, a flexible disk, hard disk, optical disk, magneto-optical disk, CD-ROM, CD-R, magnetic tape, non-volatile memory card, ROM, or the like may be used.

The functions of the above embodiments may be implemented not only by the program code read out and executed by a computer, but also by part or all of the actual processing executed, in accordance with instructions from the program code, by an OS (operating system) or the like running on a computer.

Furthermore, the functions of the above embodiments may also be implemented by part or all of the actual processing executed by a CPU or the like contained in a function expansion board inserted in the computer or a function expansion unit connected to the computer if the processing is performed in accordance with instructions from the program code that has been read out of the storage medium and written into memory on the function expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-347932 filed Dec. 1, 2005 and Japanese Patent Application No. 2006-316326 filed on Nov. 22, 2006, which are hereby incorporated by reference herein in their entirety.

What is claimed is:

1. An inkjet printing apparatus, which prints using a nozzle array of a printhead based on image data, comprising:
   an edge detecting unit adapted to detect an edge portion and a non-edge portion in the image data;
   a memory adapted to store a plurality of edge reducing masks used to reduce image data in the edge portion and a plurality of non-edge reducing masks used to reduce image data in the non-edge portion;
   a reduced data generating unit adapted to generate multiple sets of edge reduced data from image data in the edge portion using the plurality of edge reducing masks and to generate multiple sets of non-edge reduced data from image data in the non-edge portion using the plurality of non-edge reducing masks; and
   a printing data generating unit adapted to generate multiple sets of printing data by combining the multiple sets of edge reduced data and the multiple sets of non-edge reduced data.

2. The inkjet printing apparatus according to claim 1, wherein
   the plurality of edge reducing masks and the plurality of non-edge reducing masks stored in the memory are masks which make the duty factor for printing of the non-edge portion higher than the duty factor for printing of the edge portion.

3. The inkjet printing apparatus according to claim 1, wherein
   the non-edge reducing masks which reduce the non-edge portion have a lower reducing rate for image data than the edge reducing masks which reduce the edge portion.

4. The inkjet printing apparatus according to claim 1, wherein
   the printhead has multiple nozzle arrays which discharge the same ink, and
   the printing data generating unit generates the multiple sets of printing data for the multiple nozzle arrays.

5. The inkjet printing apparatus according to claim 1, wherein
   a plurality of the printheads are provided, each printhead having a nozzle array which discharges the same ink, and
   the printing data generating unit generates the multiple sets of printing data for the plurality of printheads.

6. The inkjet printing apparatus according to claim 1, wherein the inkjet printing apparatus performs printing by scanning the same area of a recording medium multiple times with the printhead, and the printing data generating unit generates the multiple sets of printing data for the multiple scans for printing.

7. The inkjet printing apparatus according to claim 6, wherein one of the plurality of edge reducing masks has a duty factor of 100% and the rest of the edge reducing masks have a duty factor of 0% to print the edge portion in a single printing scan.

8. The inkjet printing apparatus according to claim 1, wherein when the inkjet printing apparatus performs printing with a plurality of different nozzles on the same area of a recording medium, one of the plurality of edge reducing masks has a duty factor of 100% and the rest of the edge reducing masks have a duty factor of 0%.

9. The inkjet printing apparatus according to claim 1, further comprising:

a selection unit adapted to select an edge reducing mask and a non-edge reducing mask for use by the reduced data generating unit from among the edge reducing masks and the non-edge reducing masks stored in the memory, according to the printing condition of the image data.

10. The inkjet printing apparatus according to claim 9, wherein the inkjet printing apparatus has a plurality of printing modes which differ in the scanning speed of the printhead or in the number of times the same area of a recording medium is scanned for printing by the nozzles of the printhead, and the printing condition comprises the printing mode.

11. The inkjet printing apparatus according to claim 9, wherein the printing condition comprises the type of recording medium.

12. The inkjet printing apparatus according to claim 9, wherein depending on the printing condition, the selection unit selects such an edge reducing mask and non-edge reducing mask such that the duty factor for printing of the non-edge portion will not be higher than the duty factor for printing of the edge portion.

13. The inkjet printing apparatus according to claim 1, wherein the edge detecting unit detects an edge portion and non-edge portion of image data for a predetermined color for which ink is discharged from the nozzles of the printhead out of image data for multiple colors.

14. An inkjet printing apparatus, which prints with a nozzle array of a printhead based on image data, comprising:

an edge detecting unit adapted to detect an edge portion and a non-edge portion in the image data;

a memory adapted to store a plurality of reducing masks used to reduce image data in the edge portion and the non-edge portion;

a reducing unit adapted to reduce image data in the edge portion and the non-edge portion using a plurality of masks for each of the edge portion and the non-edge portion; and a generating unit adapted to generate multiple sets of printing data by combining multiple sets of image data in the edge portion and multiple sets of image data in the non-edge portion reduced by the reducing unit.

15. An inkjet printing apparatus, which prints with a nozzle array of a printhead based on image data, comprising:

an edge detecting unit adapted to detect an edge portion and a non-edge portion in the image data;

a memory adapted to store a plurality of reducing masks used to reduce image data in the edge portion and the non-edge portion;

a reduced data generating unit adapted to generate first edge reduced data and second edge reduced data from image data in the edge portion using a plurality of reducing masks as well as to generate first non-edge reduced data and second non-edge reduced data from image data in the non-edge portion using a plurality of reducing masks which differ in reducing rates from the plurality of reducing masks used for the edge portion; and a printing data generating unit adapted to generate printing data by combining the first edge reduced data and the first non-edge reduced data and combining the second edge reduced data and the second non-edge reduced data.

16. An inkjet printing method for an inkjet printing apparatus, which prints with a nozzle array of a printhead based on image data, comprising the steps of:

detecting an edge portion and a non-edge portion in the image data;

generating multiple sets of edge reduced data from image data in the edge portion using a plurality of edge reducing masks and generating multiple sets of non-edge reduced data from image data in the non-edge portion using a plurality of non-edge reducing masks; and generating multiple sets of printing data by combining the multiple sets of edge reduced data and the multiple sets of non-edge reduced data.

17. The inkjet printing apparatus according to claim 15, wherein the plurality of edge reducing masks and the plurality of non-edge reducing masks are such that the duty factor for printing of the non-edge portion will be higher than the duty factor for printing of the edge portion.

* * * * *

UNITED STATES PATENT AND TRADEMARK OFFICE
CERTIFICATE OF CORRECTION

| | |
|---|---|
| PATENT NO. | : 7,396,098 B2 |
| APPLICATION NO. | : 11/563942 |
| DATED | : July 8, 2008 |
| INVENTOR(S) | : Daigoro Kanematsu et al. |

It is certified that error appears in the above-identified patent and that said Letters Patent is hereby corrected as shown below:

Col. 5, line 55, "(Step S102)" should read --(Step S102).--

Col. 11, line 11, "to-fifth" should read --to fifth--.

Col. 13, line 58, "and" should read --and a--.

Signed and Sealed this

Tenth Day of March, 2009

JOHN DOLL
*Acting Director of the United States Patent and Trademark Office*